(12) United States Patent
Takegawa et al.

(10) Patent No.: US 10,850,619 B2
(45) Date of Patent: Dec. 1, 2020

(54) POWER CONVERSION SYSTEM

(71) Applicants: Mitsubishi Electric Corporation, Tokyo (JP); Honda Motor Co., Ltd., Tokyo (JP)

(72) Inventors: Kazuki Takegawa, Tokyo (JP); Satoshi Ishibashi, Tokyo (JP); Kazuhiko Otsuka, Tokyo (JP); Masaya Takahashi, Saitama (JP); Naotaka Tsuji, Saitama (JP)

(73) Assignees: Mitsubishi Electric Corporation, Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/177,934

(22) Filed: Nov. 1, 2018

(65) Prior Publication Data
US 2019/0168613 A1 Jun. 6, 2019

(30) Foreign Application Priority Data

Dec. 5, 2017 (JP) .................................. 2017-233074

(51) Int. Cl.
*B60L 3/00* (2019.01)
*H02P 27/06* (2006.01)
(Continued)

(52) U.S. Cl.
CPC .............. *B60L 3/00* (2013.01); *H02J 7/0063* (2013.01); *H02J 9/06* (2013.01); *H02P 27/06* (2013.01); *H02P 27/08* (2013.01); *H02P 29/024* (2013.01); *B60L 50/50* (2019.02); *B60L 2210/42* (2013.01); *B60Y 2200/91* (2013.01); *H02J 7/345* (2013.01); *H02J 2007/0067* (2013.01)

(58) Field of Classification Search
CPC . B60L 3/00; B60L 50/50; H02J 7/0063; H02J 9/06; H02J 7/345; H02P 27/06
USPC ............................................................ 307/23
See application file for complete search history.

(56) References Cited

FOREIGN PATENT DOCUMENTS

| JP | 51-121156 A | 10/1976 |
| JP | 10-066245 A | 3/1998 |

(Continued)

OTHER PUBLICATIONS

Japanese Office Action in Patent Application No. 2017-233074 dated Oct. 23, 2018.

(Continued)

*Primary Examiner* — Michael R. Fin
(74) *Attorney, Agent, or Firm* — Sughrue Mion, PLLC; Richard C. Turner

(57) ABSTRACT

A power conversion device includes a backup power source as a power source for a discharge controller that discharges electric charges of a capacitor, and an abnormal state in the backup power source or loads is not capable of being dealt with when power is supplied to loads from the backup power source, which makes an output voltage of the backup power source be in an abnormal state. In order to solve the problem, when an abnormality occurs in the backup power source or in loads and the abnormality is detected in power supply from the backup power source, a place where the abnormality occurs is specified. When the specified place where the abnormality occurs is a load, power supply to the load is stopped, thereby preventing the output voltage of the backup power source from being abnormal even when an abnormality occurs in part of power supply destinations.

9 Claims, 6 Drawing Sheets

(51) Int. Cl.
    *H02J 7/00*         (2006.01)
    *H02J 9/06*         (2006.01)
    *H02P 29/024*    (2016.01)
    *H02P 27/08*     (2006.01)
    *H02J 7/34*         (2006.01)
    *B60L 50/50*     (2019.01)

(56) References Cited

FOREIGN PATENT DOCUMENTS

| | | | |
|---|---|---|---|
| JP | 10-178738 | A | 6/1998 |
| JP | 3250448 | B2 | 1/2002 |
| JP | 2011-259517 | A | 12/2011 |
| JP | 2015-073353 | A | 4/2015 |
| JP | 2016-082846 | A | 5/2016 |
| JP | 2017-192185 | A | 10/2017 |

OTHER PUBLICATIONS

Communication dated Jul. 1, 2020 from the State Intellectual Property Office of the P.R.C. in Application No. 201811442623.9.

FIG. 5

|    | LOAD A | LOAD B | LOAD C | LOAD D | Vth1＜BV＜Vth2 |
|----|--------|--------|--------|--------|---------------|
|    | NORMAL | ABNORMAL | ABNORMAL | ABNORMAL | |
| 1  | ON  | ON  | ON  | ON  | NG |
| 2  | OFF | ON  | ON  | ON  | NG |
| 3  | OFF | OFF | ON  | ON  | NG |
| 4  | OFF | OFF | OFF | ON  | NG |
| 5  | OFF | OFF | OFF | OFF | OK |
| 6  | ON  | ON  | ON  | OFF | NG |
| 7  | OFF | ON  | ON  | OFF | NG |
| 8  | OFF | OFF | ON  | OFF | NG |
| 9  | OFF | OFF | OFF | OFF | OK |
| 10 | ON  | ON  | OFF | OFF | NG |
| 11 | OFF | ON  | OFF | OFF | NG |
| 12 | OFF | OFF | OFF | OFF | OK |
| 13 | ON  | OFF | OFF | OFF | OK |

POWER CONVERSION SYSTEM

BACKGROUND OF THE INVENTION

Field of the Invention

The present invention relates to a power conversion system, and particularly relates to a power conversion system including a backup power source supplying power to a load.

Description of Related Art

A vehicle is equipped with many electrical apparatuses, and a vehicle such as a hybrid car is provided with a power conversion device between a chargeable/dischargeable DC power source and a three-phase AC motor. The power conversion device includes a boost converter that boosts a DC voltage supplied from the DC power source, a primary smoothing capacitor that smooths a voltage between the DC power source and the boost converter, an inverter that converts a high DC voltage outputted from the boost converter into an AC voltage and a secondary smoothing capacitor that smooths a voltage between the boost converter and the inverter.

In such power conversion device provided in the car, it is necessary to discharge electric charges of the smoothing capacitor at the time of an accident such as a collision for preventing electrical shock due to electric charges accumulated in the smoothing capacitor. However, there is a case where an abnormality occurs in a power source for controlling discharge and it is difficult to supply power at the time of the accident.

Accordingly, it is proposed that a backup power source is provided for positively controlling discharge of the smoothing capacitor when necessary such as at the time of an accident. Particularly in Patent Literature 1, it is disclosed that a device includes a controller that controls electric charges of a smoothing capacitor, a battery from which electric charges of the smoothing capacitor are discharged and a discharge circuit that supplies residual charges of the smoothing capacitor to the controller, which is configured so that the residual charges of the smoothing capacitor are converted in voltage and charged in the battery, in which the smoothing capacitor is discharged by charging the battery, and the controller is continued to be driven by supplying residual charges to the controller by the discharge circuit when it is difficult to charge the battery. Furthermore, it is explained that electrical energy charged in the battery is used for driving another electric component.

Although the use of the backup power source for driving another electric component is explained in Patent Literature 1, a case where the backup power source becomes in an abnormal state and a case where another electric component connected to the backup power source is in an abnormal state are not assumed in the contents disclosed in Patent Literature 1, therefore, occurrence of an abnormality in an output voltage of the backup power source is a new problem.
[Patent Literature 1] Japanese Patent No. 3250448

SUMMARY OF THE INVENTION

In order to solve the above problem, an object of the present invention is to provide a small-sized and low-cost power conversion system capable of quickly discharging electric charges accumulated in a smoothing capacitor even when supply of the power source is stopped due to a collision or the like of a vehicle.

In order to achieve the above object, a power conversion system connected between a power conversion DC power source and a motor is provided, which includes an inverter, a capacitor that smooths a voltage between terminals between the power conversion DC power source and the inverter, a discharge controller having an inverter controller that controls switching operations of the inverter and a discharge determination instruction section that instructs the inverter controller to discharge electric charges of the capacitor, a control DC power source supplying power to the discharge controller as a controller power source, and a backup power source connected to the capacitor in parallel and supplying power to the discharge controller when power supply from the control DC power source is stopped, in which loads are connected to the backup power source, the power is supplied to the loads from the backup power source, and when an abnormality occurs in the backup power source or loads, a place where the abnormality occurs is specified so as not to occur abnormality in the output voltage of the backup power source by stopping the power supply to the specified place where the abnormality occurs.

In the case where an abnormality occurs in the backup power source or loads and the abnormality is detected in power supply from the backup power source, a place where an abnormality occurs in loads is specified and power supply to the load in which the abnormality occurs is stopped, thereby suppressing the stop of power supply to the loads to the minimum and smoothly discharging electric charges stored in the smoothing capacitor even when supply of the power source is stopped due to a collision and an abnormality occurs in loads. Power is supplied to loads from the backup power source when supply of the power source is not stopped, therefore, a dedicated power source is not necessary and a small-sized and low-cost power conversion system can be provided.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 5 is a chart showing states in which the place where the abnormality occurs is specified in loads in the power conversion system according to the embodiment.

DESCRIPTION OF EMBODIMENTS

Hereinafter, a power conversion system according to an embodiment will be explained with reference to the drawings. A case where the power conversion system is mounted on a car will be explained in the following embodiment, however, the power conversion system may be mounted on vehicles other than the car.

Embodiment

Figure 1:
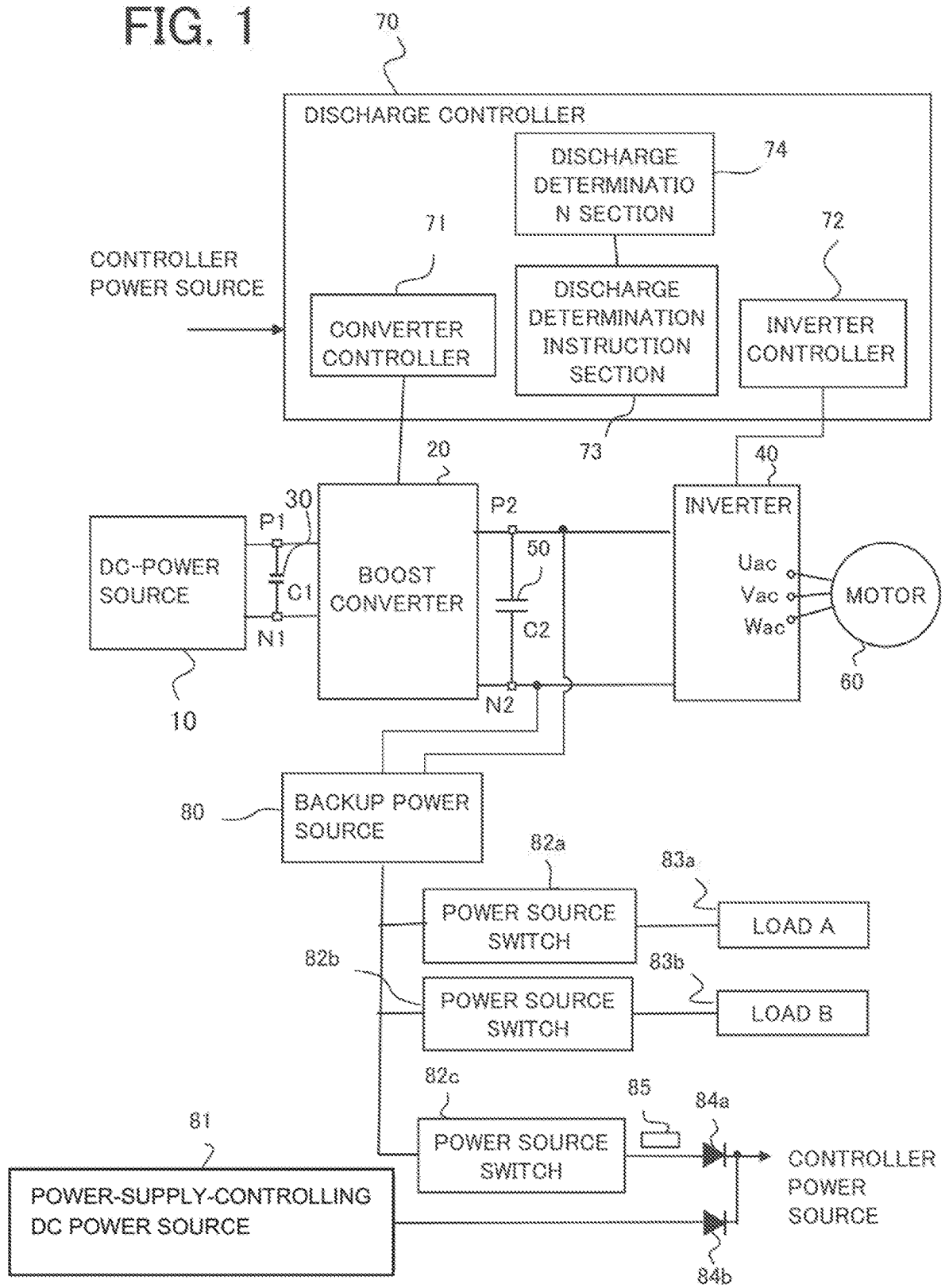
FIG. 1 is a configuration diagram showing a power conversion system according to an embodiment.

FIG. 1 is a configuration diagram showing a power conversion system according to the embodiment. In FIG. 1, the power conversion system is provided between a power conversion DC power source 10 and a three-phase AC motor 60, including a boost converter 20, an inverter 40, a secondary smoothing capacitor 50, a discharge controller 70, a backup power source 80, a power-supply-controlling DC power source 81, a power source switches 82a, 82b, and 82c, loads 83a and 83b and a voltage detector 85.

The power conversion DC power source 10 is capable of charging and discharging, which exchanges power with the three-phase AC motor 60 through the inverter 40. The boost converter 20 is provided between the power conversion DC power source 10 and the inverter 40, and a DC voltage supplied from the power conversion DC power source 10 is boosted by DC/DC conversion. (When an output voltage of the power conversion DC power source 10 is sufficient, the boost converter 20 may be omitted). A primary smoothing capacitor 30 is connected between the power conversion DC power source 10 and the boost converter 20, which smooths the voltage between the power conversion DC power source 10 and the boost converter 20.

The inverter 40 converts high DC voltage outputted from the boost converter 20 into an AC voltage by DC/AC conversion. The secondary smoothing capacitor 50 is connected between the boost converter 20 and the inverter 40, which smooths the voltage between the boost converter 20 and the inverter 40.

The AC voltage outputted from the inverter 40 is applied to the three-phase AC motor 60, thereby controlling a driving force and a braking force of the vehicle.

The discharge controller 70 includes a converter controller 71, an inverter controller 72, a discharge determination instruction section 73 and a discharge determination section 74. The discharge determination instruction section 73 instructs the inverter controller 72 to discharge electric charges accumulated in the secondary smoothing capacitor 50 in a case where a collision of the vehicle is detected by the discharge determination section 74. In the configuration, when electric charges accumulated in the secondary smoothing capacitor 50 are discharged, electric charges accumulated in the primary smoothing capacitor 30 and an energy transfer capacitor 23 are discharged at the same time. The detection of the collision of the vehicle by the discharge determination section 74 is indirectly performed based on various condition variations of the vehicle generated at the time of the collision.

Figure 2:
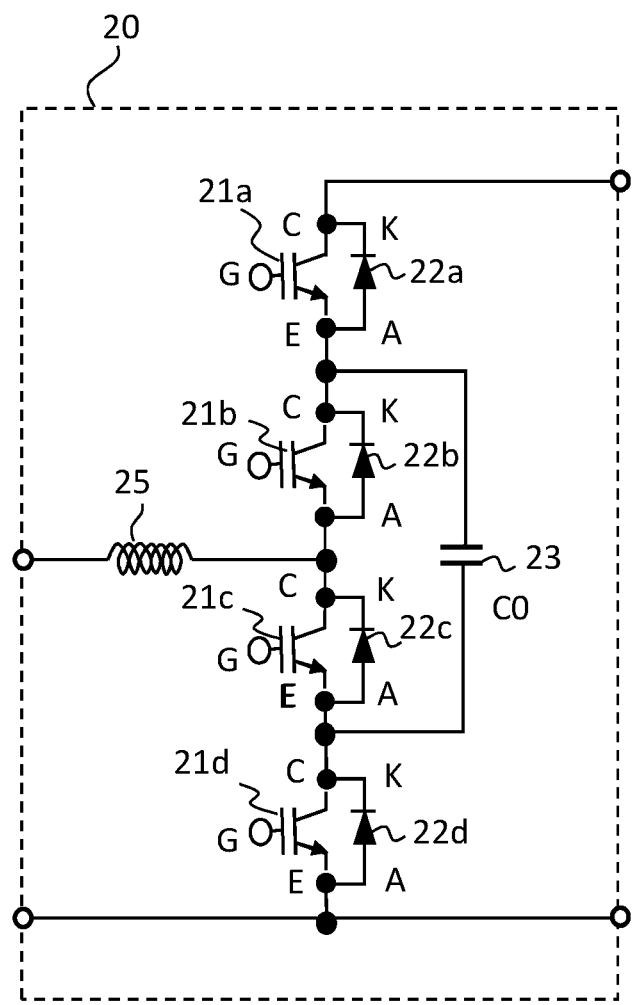
FIG. 2 is a circuit diagram showing a configuration of a boost converter of the power conversion system.
Figure 3:
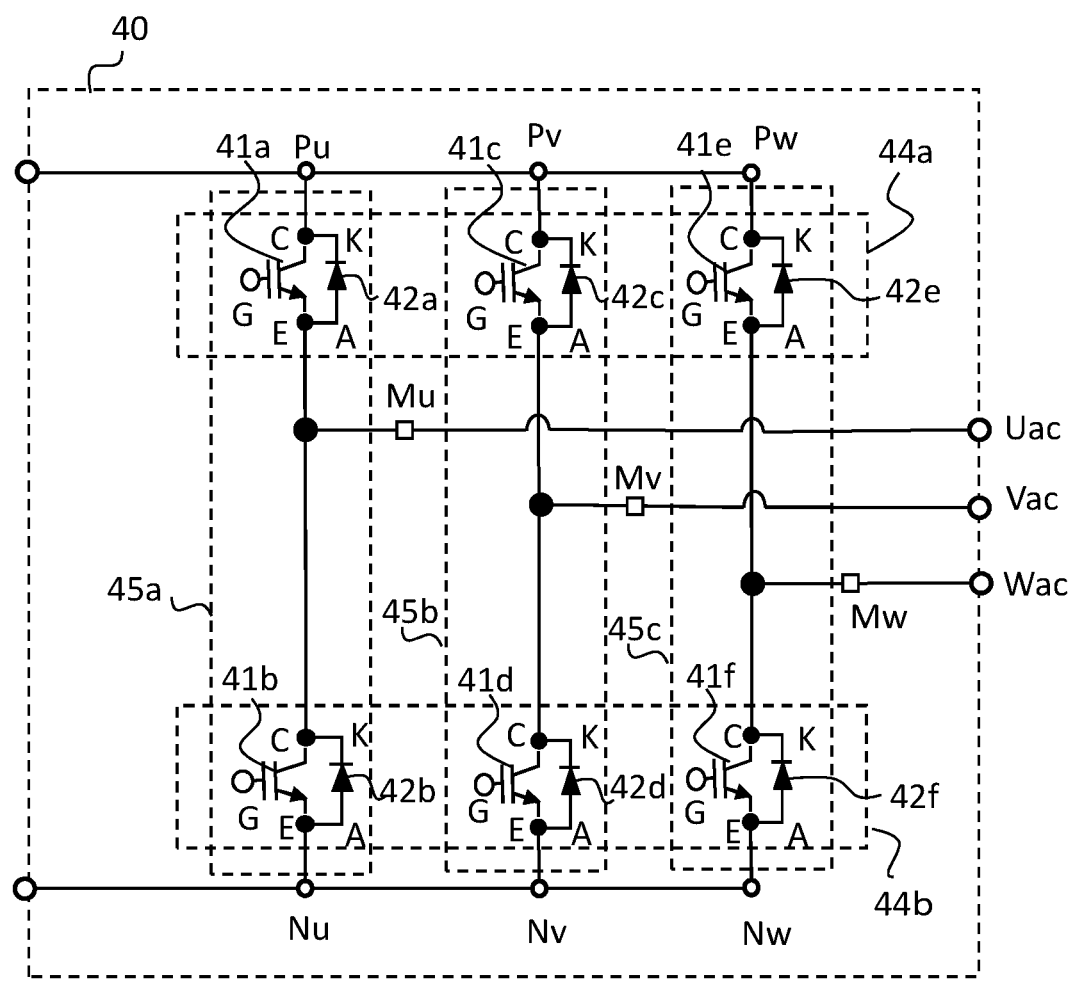
FIG. 3 is a circuit diagram showing a configuration of an inverter of the power conversion system.

The converter controller 71 controls switching operations of semiconductor switching devices 21a, 21b, 21c and 21d as components of power semiconductor devices included in the boost converter 20 the configuration of which is shown in FIG. 2 and performs DC/DC conversion in the boost converter 20. The inverter controller 72 controls switching operations of semiconductor switching devices 41a, 41b, 41c, 41d, 41e and 41f in an upper-arm side power semiconductor device 44a and a lower-arm side power semiconductor device 44b as switching arms included in the inverter 40 the configuration of which is shown in FIG. 3 and performs DC/AC conversion inside the inverter 40.

In the boost converter 20 and the inverter 40, the power semiconductor device is configured so that a semiconductor switching device and a semiconductor rectifier are connected in anti-parallel with each other as one unit. A serial connected body of the power semiconductor devices is called an arm.

In an arm of the boost converter 20, an IGBT made of Si as a material is used for the semiconductor switching devices 21a, 21b, 21c and 21d, and a PiN diode also made of Si as a material is used for semiconductor rectifiers 22a, 22b, 22c and 22d as shown in FIG. 2.

A cathode electrode K of the semiconductor rectifier 22a is connected to a collector electrode C of the semiconductor switching device 21a, an anode electrode A of the semiconductor rectifier 22a is connected to an emitter electrode E of the semiconductor switching device 21a, which are connected in anti-parallel with each other as one unit of the power semiconductor device. Here, an emitter electrode E of the semiconductor switching device 21d is connected to a low-voltage side node N1 of the primary smoothing capacitor 30 as well as connected to a low-voltage side node N2 of the secondary smoothing capacitor 50. The low-voltage side node N2 is connected to nodes Nu, Nv and Nw of the lower-arm side power semiconductor device 44b of the inverter 40.

Accordingly, a low-voltage side output terminal of the power conversion DC power source 10, the low-voltage side nodes N1, N2 and the Nodes Nu, Nv and Nw of the lower-arm side power semiconductor device 44b of the inverter 40 have the same potential (typically, a potential Vn).

A collector electrode C of the semiconductor switching device 21d is connected to an emitter electrode E of the semiconductor switching device 21c and a low-voltage side node of the energy transfer capacitor 23. A collector electrode C of the semiconductor switching device 21c is connected to an emitter electrode E of the semiconductor switching device 21b and an end of a coil of a reactor 25. A collector electrode C of the semiconductor switching device 21b is connected to the emitter electrode E of the semiconductor switching device 21a and a high-voltage side node of the energy transfer capacitor 23.

On the other hand, the collector electrode C of the semiconductor switching device 21a is connected to a high-voltage side node P2 of the secondary smoothing capacitor 50. The high-voltage side node P2 is connected to nodes Pu, Pv and Pw of the upper-arm side power semiconductor device 44a of the inverter 40. Therefore, the high-voltage side node P2 and the nodes Pu, Pv and Pw of the upper-arm side power semiconductor device 44a of the inverter 40 have the same potential (typically, a potential Vp).

The inverter 40 is configured as shown in FIG. 3. The number of arms provided in the inverter 40 corresponds to the number of phases of the three-phase AC motor 60 to be driven, and U-phase, V-phase and W-phase three switching arms 45a, 45b and 45c are provided in this case.

In the U-phase switching arm 45a of the inverter 40, for example, the insulated gate bipolar transistor (IGBT) made of Si as a material is used for the semiconductor switching devices 41a and 41b, and the PiN diode also made of Si as a material is used for the semiconductor rectifiers 42a and 42b.

A cathode electrode K of the semiconductor rectifier 42a is connected to a collector electrode C of the semiconductor switching device 41a, and an anode electrode A of the semiconductor rectifier 42a is connected to an emitter electrode E of the semiconductor switching device 41a, which are connected in anti-parallel with each other as one unit of the power semiconductor device. Similarly, a cathode electrode K of the semiconductor rectifier 42b is connected to a collector electrode C of the semiconductor switching device 41b, and an anode electrode A of the semiconductor rectifier 42b is connected to an emitter electrode E of the semiconductor switching device 41b. The U-phase switching arm 45a of the inverter 40 is configured so that the power semiconductor device including the semiconductor switching device 41a and the semiconductor rectifier 42a is connected to the power semiconductor device including the semiconductor switching device 41b and the semiconductor rectifier 42b in series.

The V-phase switching arm 45b and the W-phase switching arm 45c of the inverter 40 are also configured so that the power semiconductor device including the semiconductor switching device 41c and the semiconductor rectifier 42c is connected to the power semiconductor device including the semiconductor switching device 41d and the semiconductor rectifier 42d in series, as well as so that the power semiconductor device including the semiconductor switching device 41e and the semiconductor rectifier 42e is connected to the power semiconductor device including the semiconductor switching device 41f and the semiconductor rectifier 42f in series. The inverter controller 72 controls switching operations of semiconductor switching devices inside the upper-arm side power semiconductor device 44a and the lower-arm side power semiconductor device 44b in the switching arms 45a, 45b and 45c included in the inverter 40 and adjusts potentials of connection nodes Uac, Vac and Wac with respect to the three-phase AC motor 60, thereby controlling a current amount flowing in the three-phase AC motor 60.

As a result, the three-phase AC motor 60 generates power for controlling a driving force and a braking force and controlling of the vehicle. The inverter controller 72 also acquires rotation information of the three-phase AC motor 60 from a rotation speed sensor 61.

Next, the operation of the power conversion device at the time of a collision of the vehicle will be explained. First, the discharge controller 70 stops the vehicle safely when a collision of the vehicle is detected by the discharge determination section 74.

Subsequently, power supply from the power conversion DC power source 10 is stopped, and the discharge determination instruction section 73 instructs the inverter controller 72 to execute a discharge operation. The inverter controller 72 first controls the semiconductor switching devices 41a, 41b, 41c, 41d, 41e and 41f inside the inverter 40 to discharge electric charges of the secondary smoothing capacitor 50 in accordance with the instruction for executing the discharge operation by the discharge determination instruction section 73.

When the output voltage of the power-supply-controlling DC power source 81 is normal, the power is supplied from the power-supply-controlling DC power source 81 to the discharge controller 70. When power supply from the power-supply-controlling DC power source 81 is stopped, the power is supplied from the backup power source 80 to the discharge controller 70. For example, it is preferable that a backup power source diode 84a and a control DC power source diode 84b are connected as shown in FIG. 1 and an output voltage of the backup power source 80 is set to a value lower than an output voltage of the power-supply-controlling DC power source 81, thereby realize the above operation.

The backup power source 80 supplies the power also to the loads 83a and 83b. When there is an instruction for executing the discharge operation by the discharge determination instruction section 73, it is desirable that power supply to the loads 83a and 83b is stopped. The power may be supplied to one load as well as plural loads. FIG. 1 shows an example in which the power is supplied to two loads.

As a case where an abnormality occurs in the backup power source 80 or the loads 83a and 83b, when an abnormality occurs in power supply from the backup power source 80, all loads stop. On the other hand, when an abnormality occurs in the load, a place where the abnormality occurs is specified and power supply to the specified place where the abnormality occurs is stopped, thereby continuing supplying the power to another load even when an abnormality occurs in part of loads as power supply destinations.

It is preferable to stop power supply in the predetermined order for specifying the place where the abnormality occurs. The order in which power supply is stopped is preferably determined in descending order of failure rate. That is, it is possible to deal with the abnormality in an early stage as a load with a high failure rate has a high possibility of occurrence of an abnormality.

Figure 4:
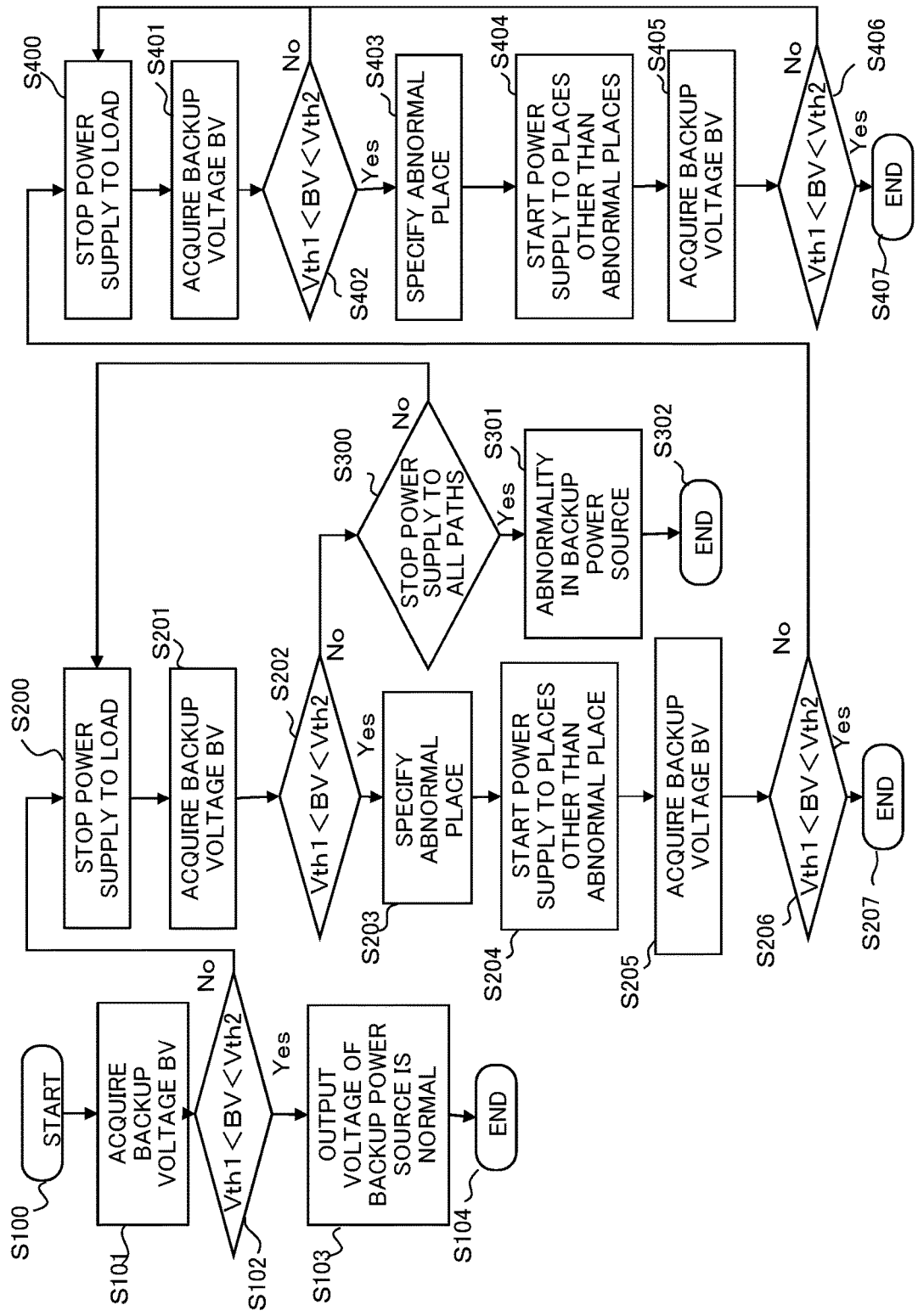
FIG. 4 is a flowchart showing the operation for specifying a place where an abnormality occurs in loads in the power conversion system according to the embodiment.

Hereinafter, a method of specifying the place where the abnormality occurs will be explained with reference to a flowchart shown in FIG. 4.

A case of a normal operation will be explained first.

First, the process proceeds to Step S101 after the start, and an output voltage value BV of the backup power source 80 is acquired from the voltage detector 85 in Step S101, then, the process proceeds to Step S102.

In Step S102, the output voltage value BV obtained in Step S101 is compared with given threshold values Vth1 and Vth2 which are previously set. Vth1 and Vth2 are setting values for determining whether there is an abnormality in power supply from the backup power source 80, in which Vth1 is the minimum output voltage value and Vth2 is the maximum output voltage value. When the system is normally operated, it is determined that Vth1<BV<Vth2, and the process proceeds to Step S103.

In Step S103, it is determined that power supply from the backup power source 80 is normal, the step proceeds to Step S104 and the process ends.

Next, a case where an abnormality occurs in the backup power source 80 in a configuration in which the loads 83a and 83b are connected as shown in FIG. 1 will be explained. Power supply is stopped in an order of the load A83a and the load B83b for specifying the place where the abnormality occurs.

First, the process proceeds to Step S101 after the start, and the output voltage value BV of the backup power source 80 is acquired from the voltage detector 85 in Step S101, then, the process proceeds to Step S102.

In Step S102, the output voltage value BV obtained in Step S101 is compared with given threshold values Vth1 and Vth2 which are previously set. When there is an abnormality in the backup power source 80, Vth1<BV<Vth2 is not determined, and the process proceeds to Step S200.

In Step S200, power supply to the load A83a is stopped in the order which is previously set. For example, power supply to the load A83a is stopped by turning off the power source switch 82a of the load A shown in FIG. 1, and the process proceeds to Step S201.

In Step S201, the output voltage value BV of the backup power source 80 is acquired from the voltage detector 85, and the process proceeds to Step S202.

In Step S202, the output voltage value BV obtained in Step S201 is compared with given threshold values Vth1 and Vth2 which are previously set. When there is an abnormality in the backup power source 80, Vth1<BV<Vth2 is not determined, and the process proceeds to Step S300.

Only the power supply to the load A 83a is stopped in Step S300, therefore, the process proceeds to Step S200.

In Step S200, power supply to the load A 83a and the load B 83b is stopped by, for example, turning off the power source switch 82b for the load B in addition to the power source switch 82a for the load A which is already turned off, and the process proceeds to Step S201.

In Step S201, the output voltage value BV of the backup power source 80 is acquired from the voltage detector 85, and the process proceeds to Step S202.

In Step S202, the output voltage value BV obtained in Step S201 is compared with given threshold values Vth1 and Vth2 which are previously set. When there is an abnormality in the backup power source 80, Vth1<BV<Vth2 is not determined, and the process proceeds to Step S300.

Power supply to the load A 83a and the load B 83b is stopped in S300. As power supply to the loads is stopped in all paths, the process proceeds to Step S301.

It is determined that there is an abnormality in the backup power source 80 in Step S301, and the process proceeds to Step S302, then, the process ends. At this time, it is preferable that power supply from the backup power source 80 is stopped by turning off a power source switch 82c of the controller to thereby notify the abnormality in the backup power source 80.

Next, a case where there are abnormalities in three loads (the load B 83b, a load C 83c and a load D 83d) in a configuration in which four loads (the load A 83a, the load B 83b, the load C 83c and the load D 83d) are connected will be explained. Power supply is stopped in an order of the load A 83a, the load B 83b, the load C 83c and the load D 83d for specifying the place where the abnormality occurs.

First, the process proceeds to Step S101 after the start (Step S100), and the output voltage value BV of the backup power source 80 is acquired from the voltage detector 85, then, the process proceeds to Step S102.

In Step S102, the output voltage value BV obtained in Step S101 is compared with given threshold values Vth1 and Vth2 which are previously set. When there are abnormalities in the load B 83b, the load C 83c and the load D 83d, Vth1<BV<Vth2 is not determined, and the process proceeds to Step S200.

In Step S200, power supply to the load A 83a is stopped in the order which is previously set, and the process proceeds to Step S201.

In Step S201, the output voltage value BV of the backup power source 80 is acquired from the voltage detector 85, and the process proceeds to Step S202.

In Step S202, the output voltage value BV obtained in Step S201 is compared with given threshold values Vth1 and Vth2 which are previously set. When there are abnormalities in the load B 83b, the load C 83c and the load D 83d, Vth1<BV<Vth2 is not determined, and the process proceeds to Step S300.

Only the power supply to the load A 83a is stopped in Step S300, therefore, the process proceeds to Step S200.

Power supply to the load B 83b, the load C 83c and the load D 83d is sequentially stopped by performing processing of the above Step S200 to Step S300 repeatedly.

When the process proceeds to Step S202 in the state where power supply to the load A 83a, the load B 83b, the load C 83c and the load D 83d is stopped, it is determined that Vth1<BV<Vth2, and the process proceed to the Step S203.

In Step S203, the load D 83d in which power supply is stopped last is specified as an abnormal place, and the process proceeds to Step S204. At this time, the abnormality of the load D83d is notified, thereby dealing with the abnormal state smoothly.

In Step S204, power supply to loads other than the load determined as abnormal place is started, and the process proceeds to Step S205.

In Step S205, the output voltage value BV of the backup power source 80 is acquired from the voltage detector 85, and the process proceeds to Step S206.

In Step S206, the output voltage value BV obtained in Step S205 is compared with given threshold values Vth1 and Vth2 which are previously set. When there are abnormalities in the load B 83b, the load C 83c and the load D 83d, Vth1<BV<Vth2 is not determined, and the process proceeds to Step S400. When the abnormal place is one place, it is determined that Vth1<BV<Vth2 here, and the process proceeds to Step S207 to end the process.

In Step S400, power supply to the load A 83a is stopped in the order which is previously set, and the process proceeds to Step S401. At this time, power supply to the load D 83d which is specified as the abnormal place is also stopped.

In Step S401, the output voltage value BV of the backup power source 80 is acquired from the voltage detector 85, and the process proceeds to Step S402.

In Step S402, the output voltage value BV obtained in Step S401 is compared with given threshold values Vth1 and Vth2 which are previously set. When there are abnormalities in the load B 83b, the load C 83c and the load D 83d, Vth1<BV<Vth2 is not determined, and the process proceeds to Step S400.

Power supply to the load B 83b and the load C 83c is sequentially stopped by performing processing of the above Step S400 to Step S402 repeatedly.

When the process proceeds to Step S402 in the state where power supply to the load A 83a, the load B 83b, the load C 83c and the load D 83d is stopped, it is determined that Vth1<BV<Vth2 is satisfied, and the process proceeds to the Step S403.

In Step S403, the load C 83c in which power supply is stopped last is specified as an abnormal place, and the process proceeds to Step S404. At this time, it is preferable to notify the abnormality of the load C 83c.

In Step S404, power supply to loads other than the loads determined as abnormal places is started, and the process proceeds to Step S405.

In Step S405, the output voltage value BV of the backup power source 80 is acquired from the voltage detector 85, and the process proceeds to Step S406.

In Step S406, the output voltage value BV obtained in Step S405 is compared with given threshold values Vth1 and Vth2 which are previously set. When there are abnormalities in the load B 83b, the load C 83c and the load D 83d, Vth1<BV<Vth2 is not determined, and the process proceeds to Step S400.

A failure of the load B 83b can be specified by performing processing of the above Step S400 to Step S406 repeatedly.

Furthermore, when the process proceeds to Step S406 in the state where power supply to the load B 83b, the load C 83c and the load D 83d is stopped, it is determined that Vth1<BV<Vth2 is satisfied, and the process proceeds to the Step S407 to end the process.

States for specifying places where abnormalities occur in the above plural loads are shown in FIG. 5.

As a result of the above processes, it is determined that there are abnormalities in the load B 83*b*, the load C 83*c* and the load D 83*d* as shown in FIG. 5, and power supply to these loads is stopped. Power supply to the load A 83*a* is continued.

Figure 6:
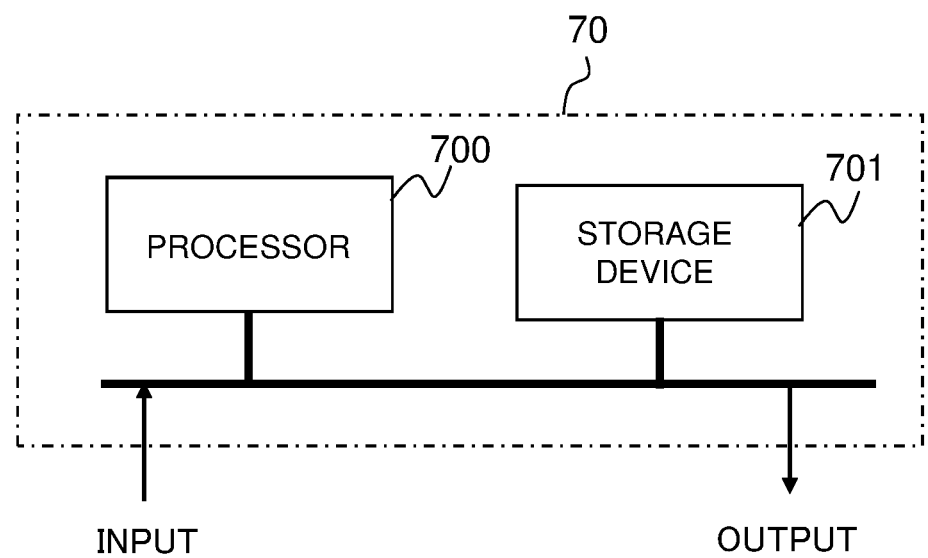
FIG. 6 is a diagram showing a configuration of a discharge controller used for the power conversion system.

The discharge controller 70 is configured by including a processor 700 and a storage device 701 as shown in FIG. 6 as an example of hardware. The storage device 701 includes a volatile storage device such as a random access memory and a non-volatile auxiliary storage device such as a flash memory, though not shown in detail. It is also preferable that an auxiliary storage device of a hard disk may be provided instead of the flash memory. The processor 700 executes a program inputted from the storage device 701. In this case, the program is inputted from the auxiliary storage device to the processor 700 through the volatile storage device. The processor 700 may also output data such as a calculation result to the volatile storage device of the storage device 701 as well as may store data in the auxiliary storage device through the volatile storage device.

As described above, it is possible to provide the small-sized and low-cost power conversion system capable of smoothly discharging electric charges accumulated in the smoothing capacitor in a state where not all loads to which power is supplied from the backup power source are unavailable by specifying a place where the abnormality occurs in loads and stopping power supply to the specified place where the abnormality occurs in loads when an abnormality occurs in the backup power source or in loads.

In the above embodiment, the case where power is supplied from the backup power source to plural loads has been explained. In a case of a single load, the invention can be executed in the same manner by determining whether the backup power source is in the abnormal state or the load is in the abnormal state in a simple procedure.

Suitable combinations, suitable alterations and omission of arbitrary components in the embodiment may occur within a scope of the present invention.

What is claimed is:

1. A power conversion system connected between a power conversion DC power source and a motor, comprising:
    an inverter;
    a capacitor that smooths a voltage between terminals between the power conversion DC power source and the inverter;
    a discharge controller having an inverter controller that controls switching operations of the inverter and a discharge determination instruction controller that instructs the inverter controller to discharge electric charges of the capacitor;
    a power-supply-controlling DC power source supplying power to the discharge controller as a power source of the discharge controller; and
    a backup power source connected to the capacitor in parallel and supplying backup power to the discharge controller when power supply from the power-supply-controlling DC power source to the discharge controller is stopped,
    wherein a plurality of loads are connected to the backup power source,
    while the backup power is supplied to the loads from the backup power source, the discharge controller detects whether an abnormality occurs in the backup power source or at least one of the loads when an output voltage value of the backup power source is outside a predetermined normal voltage range, and
    in response to detecting that the abnormality occurs in the backup power source or at least one of the loads, the power conversion system identifies a place where the abnormality occurs among the backup power source and the loads, by measuring the output voltage value of the backup power source while sequentially stopping the backup power supply to each of the loads.

2. The power conversion system according to claim 1, wherein, in response to identifying the place where the abnormality occurs in the loads, the power conversion system notifies of the place where the abnormality occurs in the loads.

3. The power conversion system according to claim 1, wherein, in response to the place where the abnormality occurs in the loads not being specified, the abnormality is notified as occurring in the backup power source.

4. The power conversion system according to claim 1, wherein, in response to the plurality of loads being connected to the backup power source, an order in which the backup power supply is stopped for identifying the place where the abnormality occurs among the plurality of loads, is previously set.

5. The power conversion system according to claim 4, wherein, in response to determining that the backup power supply from the backup power source becomes normal while the backup power supply to the loads is sequentially stopped in accordance with the previously set order, a load in which the backup power supply is stopped last is identified as the place where the abnormality occurs, among the plurality of loads, and the backup power supply is provided to loads other than the load determined as the place where the abnormality occurs.

6. The power conversion system according to claim 5, wherein, when the backup power supply to the loads other than the load determined as the place where abnormality occurs is performed, the identifying the place where the abnormality occurs in the loads is performed repeatedly until the backup power supply from the backup power source becomes normal.

7. The power conversion system according to claim 4, wherein the previously set order in which the backup power supply is stopped is a descending order of failure rates of the loads.

8. The power conversion system according to claim 5, wherein the previously set order in which the backup power supply is stopped is a descending order of failure rates of the loads.

9. The power conversion system according to claim 1, further comprising a plurality of power source switches that are connected between the backup power source and the plurality of loads, respectively,
    in response to detecting that the abnormality occurs in the backup power source or at least one of the loads, the power conversion system identifies the place where the abnormality occurs among the backup power source and the loads, by measuring the output voltage value of the backup power source while sequentially turning off each of the plurality of source switches.

* * * * *